(12) United States Patent
Ebihara et al.

(10) Patent No.: US 7,565,352 B2
(45) Date of Patent: Jul. 21, 2009

(54) INFORMATION PROCESSING DEVICE, LICENSE INFORMATION RECORDING MEDIUM, INFORMATION PROCESSING METHOD, AND COMPUTER PROGRAM

(75) Inventors: Munetake Ebihara, Kanagawa (JP); Hiroshi Kuno, Kanagawa (JP); Shuichi Makishima, Chiba (JP)

(73) Assignee: Sony Corporation, Tokyo (JP)

( * ) Notice: Subject to any disclaimer, the term of this patent is extended or adjusted under 35 U.S.C. 154(b) by 136 days.

(21) Appl. No.: 10/510,089

(22) PCT Filed: Jan. 30, 2004

(86) PCT No.: PCT/JP2004/000953

§ 371 (c)(1),
(2), (4) Date: Jun. 20, 2005

(87) PCT Pub. No.: WO2004/070613

PCT Pub. Date: Aug. 19, 2004

(65) Prior Publication Data

US 2006/0041585 A1 Feb. 23, 2006

(30) Foreign Application Priority Data

Feb. 5, 2003 (JP) ............................. 2003-027873

(51) Int. Cl.
*G06F 17/30* (2006.01)
(52) U.S. Cl. ............................................. 707/9; 707/8
(58) Field of Classification Search ............... 707/1–10, 707/100–104.1, 200–206; 709/229; 713/168, 713/164, 150, 300; 705/55, 51, 59; 717/178; 379/88.13; 719/322; 382/100, 162

See application file for complete search history.

(56) References Cited

U.S. PATENT DOCUMENTS 6,343,280 B2 * 1/2002 Clark ........................ 705/55

(Continued)

FOREIGN PATENT DOCUMENTS

EP 1 253 738 A1 10/2002

(Continued)

OTHER PUBLICATIONS

Better Business Bureau, "Computer Software Priacy", Mar. 25, 2003, www.bbb.org/Alerts/article.asp?ID=434, pp. 1-5.*

(Continued)

*Primary Examiner*—Diane Mizrahi
(74) *Attorney, Agent, or Firm*—Finnegan, Henderson, Farabow, Garrett & Dunner, L.L.P.

(57) ABSTRACT

The present invention provides an improved arrangement for a content use eligibility determination process based on content usage condition information. In the content use eligibility determination process, a user device performs a checking process of checking a property selection list as the content usage condition information against a property list as user device attribute information. The user device performs a determination process of determining whether data corresponding to property definition data in the property selection list is present in the property list, and performs a content use eligibility determination process in accordance with a decision process sequence of a next process step based on a process setting code accompanying the property definition data. With this arrangement, even if the addition of new property definition data occurs, the user device performs precise content use eligibility determination of a content by simply performing a checking process against the property list and a process based on the process setting code.

17 Claims, 10 Drawing Sheets

| PROCESS SETTING CODE (hex) | PRESENT IN OWN DEVICE ATTRIBUTE (PROPERTY LIST) | ABSENT IN OWN DEVICE ATTRIBUTE (PROPERTY LIST) | BASIC MEANING OF PROCESS SETTING CODE |
|---|---|---|---|
| 0x00 | NOT PERMITTED | | NG |
| 0x01 | PERMITTED | | OK |
| 0x02 - 0x7f | ++ NUMBER OF LINES | NUMBER OF LINES += VALUE | Jump if not exist |
| 0x80 | NOT PERMITTED | ++ NUMBER OF LINES | NG if exist |
| 0x81 | PERMITTED | ++ NUMBER OF LINES | OK if exist |
| 0x82 | ++ NUMBER OF LINES | NOT PERMITTED | NG if not exist |
| 0x83 | ++ NUMBER OF LINES | PERMITTED | OK if not exist |

U.S. PATENT DOCUMENTS

| | | | |
|---|---|---|---|
| 6,615,350 B1* | 9/2003 | Schell et al. | 713/168 |
| 6,760,324 B1* | 7/2004 | Scott et al. | 370/352 |
| 6,847,950 B1* | 1/2005 | Kamibayashi et al. | 705/57 |
| 6,918,113 B2* | 7/2005 | Patel et al. | 717/178 |
| 6,968,384 B1* | 11/2005 | Redding et al. | 709/229 |
| 7,043,088 B2* | 5/2006 | Chiu et al. | 382/233 |
| 7,123,608 B1* | 10/2006 | Scott et al. | 370/353 |
| 7,430,754 B2* | 9/2008 | Speare et al. | 726/1 |
| 2001/0011254 A1 | 8/2001 | Clark | |
| 2001/0023421 A1 | 9/2001 | Numao et al. | |
| 2002/0013772 A1* | 1/2002 | Peinado | 705/51 |
| 2002/0147821 A1 | 10/2002 | Ebihara | |
| 2002/0157089 A1 | 10/2002 | Patel et al. | |
| 2003/0126139 A1* | 7/2003 | Lee et al. | 707/100 |
| 2003/0229593 A1* | 12/2003 | Raley et al. | 705/55 |
| 2004/0003139 A1* | 1/2004 | Cottrille et al. | 709/331 |
| 2004/0133448 A1* | 7/2004 | Higashi et al. | 705/1 |
| 2005/0152596 A1* | 7/2005 | Walmsley | 382/162 |
| 2005/0228809 A1* | 10/2005 | Asano et al. | 707/100 |
| 2006/0059102 A1* | 3/2006 | Ebihara et al. | 705/59 |
| 2006/0230131 A1* | 10/2006 | Ebihara et al. | 709/223 |
| 2009/0028327 A1* | 1/2009 | Pinder | 380/212 |

FOREIGN PATENT DOCUMENTS

| | | |
|---|---|---|
| JP | 11-25045 | 1/1999 |
| JP | 2000-293439 | 10/2000 |
| JP | 2001-92721 | 4/2001 |
| JP | 2001-184264 | 7/2001 |
| JP | 2001-229067 | 8/2001 |
| JP | 2001-306521 | 11/2001 |
| JP | 2002-14862 | 1/2002 |
| JP | 2002-140235 | 5/2002 |

OTHER PUBLICATIONS

Bert Young et al., "Software Licensing—Serious Business", Jun. 3, 2003, ADNET News, http:www.sdnet.com, , pp. 1-3.*

Ivana Dusparic et al., "Mobile Software Licensing", Jul. 3, 2003, http://64.233.161.104/serach?cache:_V535rlxroJ:www.cs.tcd.ie/pulications/tech-rep, pp. 1-15.*

"eXtensible Access Control Markup Language (XACML) Ver.1.0", [online], OASIS, Feb. 18, 2003.

The Communication Transmitting the Supplementary European Search Report in EP Application No. 04706873.9, dated Dec. 4, 2008.

Communication Transmitting the Supplementary European Search Report in EP Application No. 04706873.9, dated Dec. 4, 2008.

ContentGuard, Driving the Standard for Interoperability in Digital Rights, XrML Software Development Kit User's Guide, Release 2.0, XP-002333477 Jun. 15, 2005.

ContentGuard, XrML: Extensible rights Markup Language, Version 1.2, XP-002333475 Nov. 30, 2001.

* cited by examiner

```xml
<?xml version="1.0"?>
<License>
  <Information>
    <LID>
      0010F000BAE60848A31C43BF6EE8D47C
    </LID>
    <LegalCopyright>
      Copyright (c) 2003 by (Content Provider Name)
    </LegalCopyright>
  </Information>
  <Operation>
    <Play>
      <PropertySelectionList>
        MagicGateAudio, 0x82;
        TimeLimit, 0x81;
      </PropertySelectionList>
      <Parameter>
        TimeLimitStart = 2003010100000000,
        TimeLimitEnd = 2003013123590000,
        DigitalOutCopyProtection = 1,
      </Parameter>
    </Play>                                             — 401
    <Move>
      <PropertySelectionList>
        MagicGateAudio, 0x82;
        CountDown, 0x82;
        CheckServer, 0x81;
      </PropertySelectionList>
      <Parameter>
        CheckServerId = 18150,
        CheckServerUrl = "%20",
        Remain = 1,
      </Parameter>
    </Move>                                             — 402
    <CheckOut>
      <PropertySelectionList>
        MagicGateAudio, 0x82;
        SDMI, 0x81;
      </PropertySelectionList>
      <Parameter>
        Remain = 3,
      </Parameter>
    </CheckOut>                                         — 403
  </Operation>
</License>
```

| PROCESS SETTING CODE (hex) | PRESENT IN OWN DEVICE ATTRIBUTE (PROPERTY LIST) | ABSENT IN OWN DEVICE ATTRIBUTE (PROPERTY LIST) | BASIC MEANING OF PROCESS SETTING CODE |
|---|---|---|---|
| 0x00 | NOT PERMITTED | | NG |
| 0x01 | | PERMITTED | OK |
| 0x02 - 0x7f | ++ NUMBER OF LINES | NUMBER OF LINES += VALUE | Jump if not exist |
| 0x80 | NOT PERMITTED | ++ NUMBER OF LINES | NG if exist |
| 0x81 | PERMITTED | ++ NUMBER OF LINES | OK if exist |
| 0x82 | ++ NUMBER OF LINES | NOT PERMITTED | NG if not exist |
| 0x83 | ++ NUMBER OF LINES | PERMITTED | OK if not exist |

FIG. 10

| PROPERTY DEFINITION DATA (or PROPERTY ID) | PROCESS SETTING CODE (hex) |     |
| --- | --- | --- |
| AAAA | 0x02 | (a) |
| BBBB | 0x81 | |
| CCCC | 0x02 | (b) |
| DDDD | 0x83 | |
| EEEE | 0x82 | (c) |
| FFFF | 0x82 | |
| GGGG | 0x81 | |

INFORMATION PROCESSING DEVICE, LICENSE INFORMATION RECORDING MEDIUM, INFORMATION PROCESSING METHOD, AND COMPUTER PROGRAM

TECHNICAL FIELD

The present invention relates to an information processing apparatus, a license information recording medium, an information processing method, and a computer program. More specifically, the present invention relates to an information processing apparatus, a license information recording medium, an information processing method, and a computer program for performing access control compatible with a variety of new and old devices in an environment where communication is performed among apparatuses connected to a network.

BACKGROUND ART

Software data (hereinafter referred to as content), such as music data, game programs, and video data is widely distributed via networks such as the internet, or using portable recording media such as a memory card, HD, DVD, and CD. These distributed contents are replayed and used on a variety of replay apparatuses owned by users, including PCs (Personal Computers), recording and replaying apparatuses, replaying only apparatuses, or game playing machines. The contents are stored in storage means of these apparatuses, such as a hard disk, a card-type storage device containing a flash memory, CD, and DVD.

The distributorship of a great deal of software contents such as game programs, music data, and image data is typically held by creators and sellers. The distribution of contents is subject to a certain constraint, in other words, authorized users only are permitted to use software and unauthorized copying of the software is prevented. In other words, distribution is performed taking into consideration security of the software.

Currently in particular, recording apparatuses and storage media for recording digital information are going to be in widespread use. These recording apparatuses and storage media repeatedly record and replay videos and sound in a manner free from degradation. Digital data is repeatedly copied with image quality and sound quality maintained. If storage media with unauthorized copied data stored thereon are distributed in the market, the copyright of a variety of contents of copyright holders including music and movies and the distributorship of the authorized sellers are violated. To prevent digital data from being copied in an unauthorized manner, implementation of a variety of process mechanisms in the digital recording apparatus and the storage media for protecting the digital data from unauthorized copying is carried out or proposed.

For example, SDMI (Secure Digital Music Initiative) that has proposed a variety of specifications relating to music delivery techniques has also proposed a specification of a copyright protection function in a portable player. Techniques for protecting copyright include limiting the number of copies or the available period of a content.

One system records and replays a content such as audio data or video data using a compact storage medium such as a flash memory, a card-type HD, and a memory card. In one usage of such a system, for example, a content, such as music, is copied from a DVD or CD to a compact storage medium and the copied content is then replayed on a portable device with the compact storage medium loaded therewithin. A content delivered via a network is stored in a large-capacity storage medium, such as a hard disk, DVD, or CD built in a personal computer, and the content is then transferred from the personal computer to-a memory card or a portable hard disk (HD). The content is then replayed on a portable device with the memory card or the hard disk loaded therein, in other words, the PC is used as a personal server of the contents. Such a usage finds many applications.

A content from a storage medium such as a CD or a content acquired via communications with the internet is stored in a large-capacity storage medium such as a hard disk, DVD, or CD, and the content is then copied or moved from the storage medium to a memory card. Replaying of the content from the memory card in an unlimited way presents a problem in the copyright protection of the content. The move of a content refers to an operation in which after the content is copied from a large-capacity storage medium to a memory card, the content is deleted from the storage medium (HD, DVD, CD, etc.) as a copy source.

From the standpoint of copyright protection, copy and move must be subject to certain degree of limitation. However, a full inhibition of copy/move is not appropriate because with the full inhibition a content cannot be moved from a PC to a portable medium to enjoy replaying the content. There is a demand for an appropriate copy/move management that allows a user to privately copy a content while protecting copyright at the same time.

When a content is transferred from a PC to a portable device and is then used, the content is preferably used within a scope that is permitted by usage conditions set corresponding to the content. For example, availability period and the number of uses permitted are set, a status reflecting the usage of the content is recorded, and the content is used within the scope of a usage condition on each of apparatuses such as a portable device, and PC.

In a system that permits a particular permitted device to use a content, an encrypted content is provided to the device on which the content is intended to be used, and a license setting the usage condition of the content is supplied to the device. The device reads content usage condition information contained in the license, and performs content use eligibility determination process based on the content usage condition information, and acquires a key for decrypting the encrypted content conditional on the determination of a content use permitted device.

In such a system that performs a content use eligibility determination based on the content usage condition information, the device using the content contains a module interpreting a usage condition description, and interprets the usage condition description received from a license provider, such as a content provider or a service provider, using the usage condition module, and determines whether own device is permitted to use the content and determines setting condition of usage.

To perform a precise determination process on the right to use content, the usage condition interpretation module of the device must be compatible with a usage condition description format. However, an access right determination process based on the usage condition description for a known copyright management system is typically a uniform access right determination process, and an effective right of use determination cannot be performed in response to the introduction of devices having new functions.

If a usage condition corresponding to a new device having a new function, such as a device enabled to output digital data, namely, a usage condition description requesting determination of whether a digital output is available is generated, an old device, namely, a usage condition interpretation module unable to interpret the digital output cannot performs precise determination on the usage condition.

If the usage condition interpretation module in the device neglects or fails to interpret a portion of information of the content usage condition description data, the determination of the access right cannot be precisely performed. This leads to a serious problem, such as violation of copyright protection of a content and the destruction of the maintenance of the authorized usage of the content. Since new apparatuses and devices currently appear in the market one after another, it becomes even more difficult to determine the right to use the content based on the usage condition description in each of the devices different in function. Conveying constraint information and extended usage condition intended for a new device is particularly difficult.

The usage condition description must have high power of expression and extendability. One description languages proposed as the usage condition description is XrML (extensible rights markup language). XrML is a description language that has power of expression based on XML (extensible markup language) and high extendability. However, it is currently still unclear as to what operation is performed as a whole system as a result of interpreting the usage condition of XrML description. The extension of the usage condition becomes a difficult job, leading to a low level of actual extendability and interchangeability regardless of theoretically high level of extendability.

Available as a minimum expression to achieve operational clarification of the usage condition description is the usage condition description intended for use with a MagicGate audio device. With its small number of description items, the usage condition description is easy to implement and it is clear as to what operation is performed. On the other hand, to perform a job to extend the usage condition to be handled, a minimum usage condition description expression must be defined again.

In this way, the known usage condition description cannot satisfy all of the high level of extendability, ease of mounting, high level of interchangeability, and operational clarification at the same time. As a result, a remedial step to update both the usage condition description format and the interpretation module in version at the same time must be taken to covey constraint information and extended usage condition to a new device. A device firmware with the usage condition interpretation module thereof difficult to update in version becomes a serious problem.

An addition of a new apparatus to a network is frequently performed. The requirement for a job to update the usage condition description format and the interpretation module thereof is a major factor impeding the content copyright management in the network.

Currently, a network including not only PCs but also consumer electronics, such as a home network is constructed at homes, and ubiquitous environments where any apparatus gains access to a network are being established. With radio LANs in widespread use, any apparatus with communication capability can easily intrude the LAN network from the outside. Under such a network environment, an unauthorized access easily takes place to networked apparatuses. The theft of confidential information through unauthorized access and unauthorized reading of contents are more likely to happen. Under such a situation, there is a need for an appropriate access control mechanism which is easy to construct and imposes no burden on public users.

DISCLOSURE OF INVENTION

In view of the above drawback, the present invention has been developed, and it is an object of the present invention to provide an information processing apparatus, a license information recording medium, an information processing method, and a computer program for performing control compatible with a variety of new and old devices, and performing appropriate access control on the variety of devices based on usage condition description in an arrangement where the access control is performed under the usage condition description.

The present invention in a first aspect relates to an information processing apparatus for performing a content use eligibility determination process and includes a storage unit for storing a property list that is an attribute information list of the information processing apparatus, and a usage condition interpretation module for performing the content use eligibility determination process through a checking process of checking a property selection list contained in content usage condition information against the property list stored in the storage unit, wherein the usage condition interpretation module performs a determination process of determining whether data corresponding to property definition data as data constituting the property selection list is present in the property list, and in accordance with a process sequence that decides a next process step based on the result of the determination process and a process setting code accompanying the property definition data, the usage condition interpretation module performs the content use eligibility determination process.

In one embodiment of the information processing apparatus of the present invention, the property list stored in the storage unit contains identification information and function information of the information processing apparatus, and the usage condition interpretation module performs a determination process of determining whether the identification information and the function information of the information processing apparatus corresponding to the property definition data as the data constituting the property selection list are contained in the property list.

In another embodiment of the information processing apparatus of the present invention, the content usage condition information contains a parameter corresponding to the property definition data as the data constituting the property selection list, and the usage condition interpretation module performs a determination process of the content usage condition based on the parameter.

In a further embodiment of the information processing apparatus of the present invention, the property list stored in the storage unit is set on per library unit basis with a library unit as a category corresponding to the usage of the content, and the usage condition interpretation module performs the content use eligibility determination process through a checking process with the property selection list indicating the content usage condition information of a content usage corresponding to the property list stored in the storage unit on a per library unit basis.

In a further embodiment of the information processing apparatus of the present invention, the property list stored in the storage unit includes any of text data, code data, and numerical data, and the usage condition interpretation module performs a determination process of determining whether any of the text data, the code data, and the numerical data matching the property definition data as the data constituting the property selection list is contained in the property list stored in the storage unit.

In a further embodiment of the information processing apparatus of the present invention, the information processing apparatus further includes a content key acquisition processor for performing an acquisition process of acquiring a content key applied to a decrypting process of an encrypted content, wherein the content key acquisition processor performs the acquisition process of the content key on condition that the usage condition interpretation module determines in the content use eligibility determination process that content use is permitted.

In a further embodiment of the information processing apparatus of the present invention, the content key acquisition processor performs the key acquisition process through a decrypting process of decrypting an enabling key block (EKB) based on a device node key (DNK) provided to the information processing apparatus in a hierarchical key delivery arrangement.

The present invention in a second aspect relates to a license information recording medium storing license information containing a property selection list constituting content usage condition information, wherein the property selection list includes at least one piece of property definition data corresponding to identification information and function information of an information processing apparatus that uses a content, and a process setting code that sets, for each of the property definition data, a process mode depending on whether data corresponding to the property definition data is present in a property list held by the information processing apparatus that uses the content.

In one embodiment of the license information recording medium of the present invention, the license information recording medium further stores a parameter corresponding to the property definition data as data constituting the property selection list.

In a further embodiment of the license information recording medium of the present invention, the property selection list is divided into categories in accordance with the usage of the content.

In a further embodiment of the license information recording medium of the present invention, the property selection list is described using XML (extended Markup Language) data.

The present invention in a third aspect relates to an information processing method for performing a content use eligibility determination process, and includes a step of acquiring a property selection list contained in content usage condition information, a step of acquiring a property list as an attribute information list of an information processing apparatus, and a usage condition interpretation process step of performing a content use eligibility determination process through a checking process of checking the property selection list against the property list, wherein the usage condition interpretation process step includes a determination step of determining whether data corresponding to property definition data as data constituting the property selection list is present in the property list, and a process decision step of deciding a next process step based on the determination process result in the determination step and a process setting code accompanying the property definition data.

In one embodiment of the information processing method of the present invention, the property list stored in the storage unit contains identification information and function information of the information processing apparatus, and the determination step includes performing a determination process of determining whether the identification information and the function information of the information processing apparatus corresponding to the property definition data as the data constituting the property selection list are contained in the property list.

In another embodiment of the information processing method of the present invention, the content usage condition information contains a parameter corresponding to the property definition data as the data constituting the property selection list, and the determination step includes performing a determination process of the content usage condition based on the parameter.

In a further embodiment of the information processing method of the present invention, the property list stored in the storage unit is set on per library unit basis with a library unit as a category corresponding to the usage of the content, and the determination step includes performing a content use eligibility determination process through a checking process with the property selection list indicating the content usage condition information of a content usage corresponding to the property list stored in the storage unit on a per library unit basis.

In a further embodiment of the information processing method of the present invention, the property list stored in the storage unit includes any of text data, code data, and numerical data, and the determination step includes performing a determination process of determining whether any of the text data, the code data, and the numerical data matching the property definition data as the data constituting the property selection list is contained in the property list stored in the storage unit.

In a further embodiment of the information processing method of the present invention, the information processing method further includes a content key acquisition process step of performing a acquisition process of a content key applied to a decrypting process of an encrypted content, on condition that content use is permitted in the content use eligibility determination process.

In a further embodiment of the information processing method of the present invention, the content key acquisition process step includes performing the key acquisition process through a decrypting process of decrypting an enabling key block (EKB) based on a device node key (DNK) provided to the information processing apparatus in a hierarchical key delivery arrangement.

The present invention in a fourth aspect relates to a computer program for performing a content use eligibility determination process, and includes a step of acquiring a property selection list as content usage condition information, a step of acquiring a property list as an attribute information list of an information processing apparatus, and a usage condition interpretation process step of performing the content use eligibility determination process through a checking process of checking the property selection list against the property list, wherein the usage condition interpretation process step includes a determination step of determining whether data corresponding to property definition data as data constituting the property selection list is present in the property list, and a process decision step of deciding a next process step based on the determination process result in the determination step and a process setting code accompanying the property definition data.

In the arrangement of the present invention, in the content use eligibility determination process, a user device checks the property selection list as the content usage condition information against the property list as attribute information list of the user device, performs the determination process of determining whether the data corresponding to the property definition data as the data constituting the property selection list is present in the property list, and in accordance with the process sequence that decides the next process step based on the result of the determination process and the process setting code accompanying the property definition data, the usage condition interpretation module performs the content use eligibility determination process. In accordance with the arrangement of the present invention, even when new property definition data is added and set in the property selection list, user devices having a variety of functions perform precise content use eligibility determination process by simply performing a checking process with the property list as the attribute information stored in the storage unit thereof and a process based on the processing setting code. An authorized content usage mechanism taking into consideration the content copyright and the right to use the content is thus established.

In the arrangement of the present invention, the property selection list, which is divided into categories in accordance with the usage of the content such as play, move, or checkout of the content, is set in the content usage condition information. The user device thus examines precisely the usage condition in accordance with the usage of the content.

In the arrangement of the present invention, the parameter is stored in response to the property definition data that is the data constituting the property selection list contained in the content usage condition information. The usage condition interpretation module of the user device performs the content usage condition determination based on the property selection list, while performing, based on the parameter, a determination process of a detailed set content usage condition.

The computer program of the present invention is supplied to a general-purpose computer system performing a variety of program codes, from a storage medium or communication medium in a computer readable form, the storage medium being a CD, FD, or MO, and the communication medium being a network. With the program provided in a computer readable form, the computer system performs processes in response to the program.

Other objects, features and advantages of the present invention will be apparent from a more detailed description of the embodiments of the present invention to be discussed later and accompanying drawings. A system in this specification refers to a logical set of a plurality of apparatuses, and does not necessarily refer to a plurality of apparatuses, each housed in its own casing.

BRIEF DESCRIPTION OF THE DRAWINGS

FIG. 7 illustrates a property selection list as content usage condition information contained in a license and a parameter structure.

FIG. 8 illustrates a specific content of a process setting code that is set with property definition data in the property selection list associated therewith.

FIG. 10 illustrates an example of the process setting code that is set with a plurality of pieces of property definition data as the property selection list.

BEST MODE FOR CARRYING OUT THE INVENTION

Summary of Content Usage System

Figure 1:
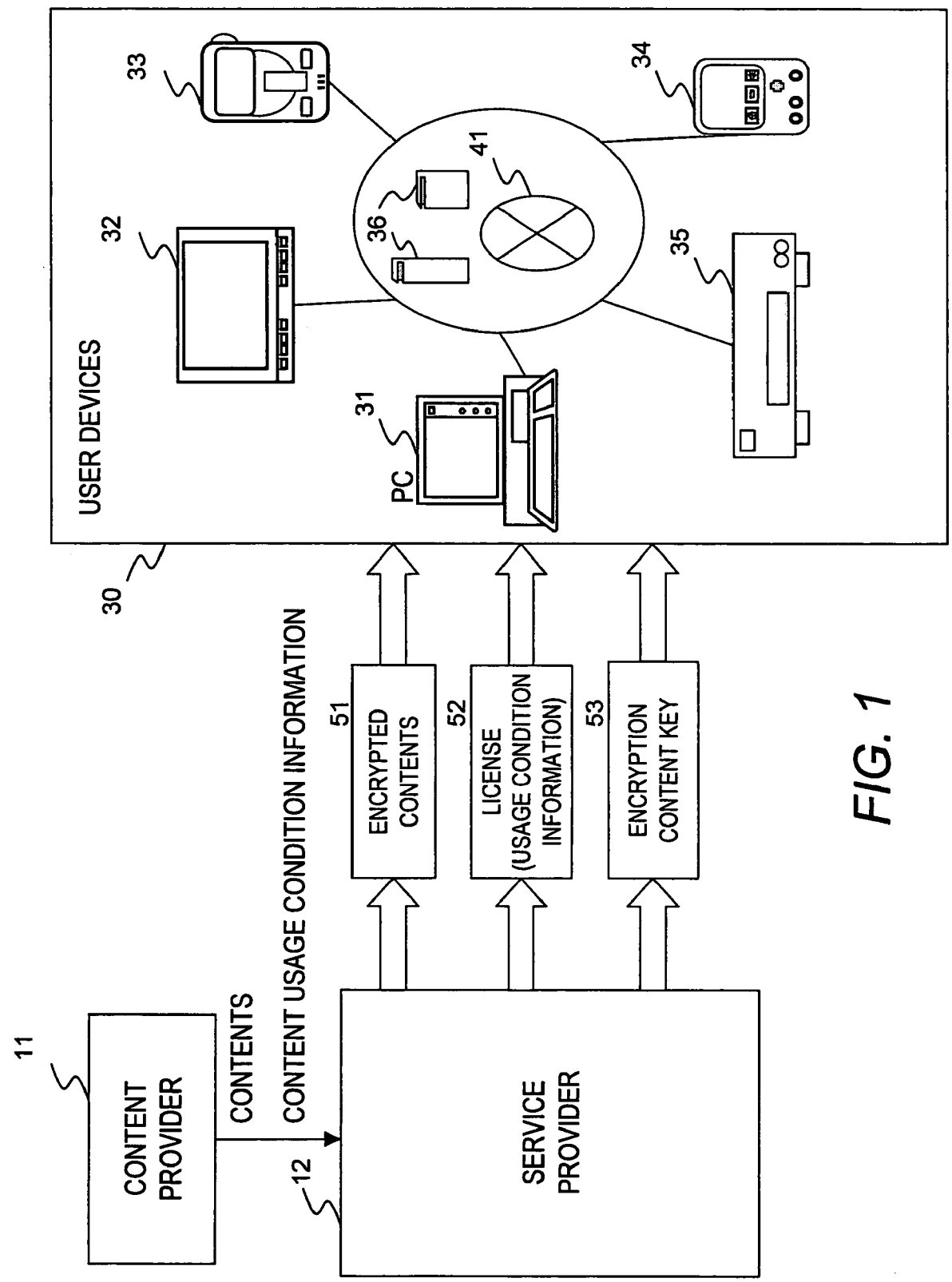
FIG. 1 is a diagram generally illustrating a content usage system implementing the present invention.

FIG. 1 generally illustrates a content usage system implementing the present invention. In the arrangement of FIG. 1, a plurality of user devices using contents are connected to a network such as a home network. Shown as user devices 30 are a PC 31, a TV 32, a portable-type replay device 33, a PDA 34, a replay player 35, and a memory card 36 having a memory and a controller.

The user device is an information processing apparatus that records or replays a variety of contents such as music, images, and programs. A service provider 12 supplies the content as an encoded content 51 to the user device 30. Furthermore, the service provider 12 provides the user device 30 with license data 52 containing content usage condition information and an encrypted content key 53 into which a content key is encrypted to be used for decrypting the encrypted content.

The encrypted content, the license data, the encrypted key content, etc. are provided to the user device 30 in various manners, for example, via a network, such as the internet, via broadcasting from a satellite, or via media such as DVD, CD, or MD.

The user device 30 interprets the usage condition information of the license data 52 using the usage condition interpretation module thereof. The user device 30 acquires an encrypted content key 53 on condition that the device 30 determines that a process satisfying a usage condition description is possible.

The user device acquires a key applied to the decryption of the encrypted content key 53 conditional on a determination that own device complies with the usage condition description contained in the license data 52. The user device 30 performs a content key acquisition process by decrypting the encrypted content key 53 using the acquired key, and decrypts the encrypted content 51 using the acquired content key. The user device 30 then uses the content, such as replaying the content, and copying and moving the content for use in other devices.

To transfer contents between devices, wired or wireless network 41, or a memory card 36 are used.

The key applied to the decrypting of the encrypted content key 53 is acquired by performing a decrypting process on an enabling key block (EKB) based on a device node key (DNK) which is provided to each user device in a hierarchical key distribution system.

For example, the supplying of the device node key (DNK) in the hierarchical key distribution system and the decrypting process of the enabling key block (EKB) based on the device node key (DNK) are described in the description of WO 02/080446 assigned to the same applicant of this application.

The present invention is applied to an entire system which uses contents on condition that the user device 30 complies with the usage condition after the usage condition information interpretation module in the user device 30 interprets the usage condition information contained in the license data 52. The above-mentioned device node key (DNK) and the enabling key block (EKB) are not essential in the arrangement of the present invention.

The usage condition information description contained in the license data 52 includes, for example, the attribute of the user device as a content replay (play) permission condition, the attribute of the user device as a content transfer (move) permission condition, the attribute of the user device as a content checkout permission condition, and the attribute of the use device as a bind process permission condition for binding a device storing the content or the license with stored data.

Here, the checkout refers to a process of temporarily outputting a content stored in a PC to another device such as a portable medium (PM). A process of returning the content from the portable medium (PM) to the PC is referred to as a checkin.

The attribute of the user device is also referred to as "property", and for example includes a variety of attributes of the device, such as the manufacturer of the device, the model and type of the device, and the functions of the device, for example, as to whether the device has a copyright protection function complying with SDMI (Secure Digital Music Initiative), a digital data output function, an encryption process function, a time comparison process function, etc.

One example of the usage condition described in the license provided to the user device is as follows:

A description such as the one reading "permission of a content play process is on condition that the manufacturer of the device is abc company, and that the device has a copyright protection function complying with SDMI (Secure Digital Music Initiative)" may be set. A specific process will be discussed later.

The usage condition interpretation module of the user device performs a determination process of determining whether own user device satisfies the content usage condition, such as the one described above, contained in the license. Only if the content usage condition is satisfied, the device can acquire a content key. The user device performs a decrypting process on the encrypted content using the acquired content key, and uses the content within the scope of the condition set in the user condition description, such as the play process, or the move process.

In the arrangement of a home network, a PC 31 storing a variety of contents functions as a content providing server, and other apparatuses connected to the home network, such as the TV 32, the portable-type replay device 33, the PDA 34, the replay player 35, etc. function as clients. In one usage, a client requests a content from the server, and after acquiring the content from the server, the client apparatus plays the content. In such a process, the content may be used in a variety of manners including move, copy, checkout, etc.

To the content in a variety of usages, the user device using the content performs a content use eligibility determination with the content usage condition contained in the license.

Figure 2:
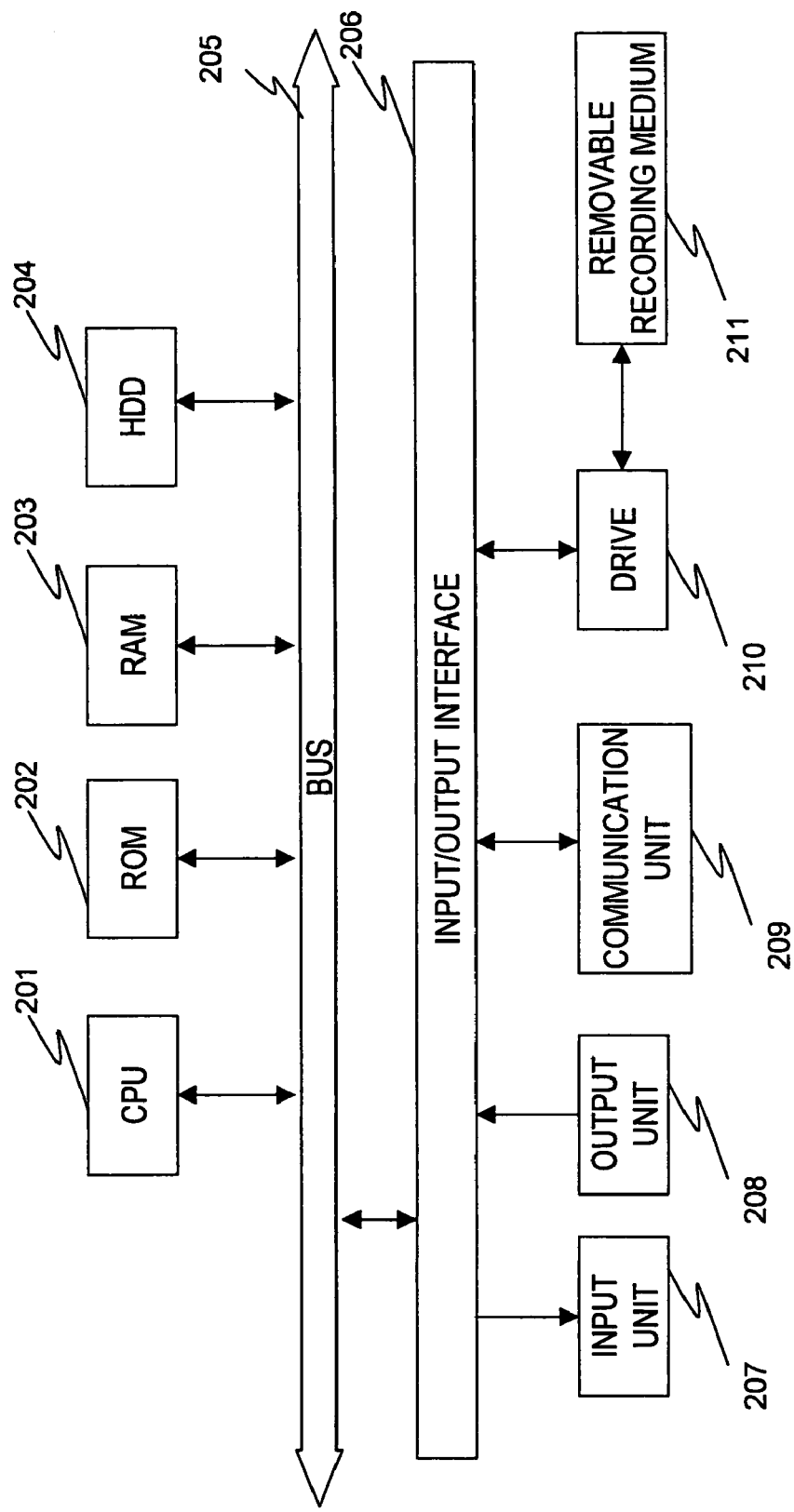
FIG. 2 illustrates the structure of an information processing apparatus as a user device that uses a content.

Referring to FIG. 2, the hardware structure of an information processing apparatus as the user device, such as the information processing apparatus constituting the PC 31 will now be discussed.

A CPU (Central Processing Unit) 201 functions as control means that executes a variety of programs and OS (Operating System) in accordance with programs stored in an ROM (Read Only Memory), an HDD 204, or the like. More specifically, the CPU 201 encrypts contents, decrypts contents, performs an encryption process using an encryption algorithm of DES (Data Encryption Standard), generates MAC for preventing alteration of data and authenticating data, performs an authentication process and a session share process when content input and output operation is performed with another device, and performs content input and output process control, the previously described content usage condition interpretation process, etc.

The ROM 202 stores fixed data, etc., of programs and parameters for arithmetic operation, used by the CPU 201. The ROM 202 also stores a data processing program that is executed when contents are exchanged with another device, the previously described content usage condition interpretation processing program, etc.

Furthermore, the ROM 202 stores attribute information of the device, including the name of the manufacturer of the device, the model and type of the device, the functions of the device, for example, as to whether the device has a copyright protection function complying with SDMI (Secure Digital Music Initiative), a digital data output function, an encryption process function, a time comparison process function, etc. The device attribute information is written onto a memory at the manufacture of the device.

The device attribute information may be stored not only in the ROM but also in a hard disk. To prevent data alteration, an MAC (Message Authentication Code) value is preferably generated and attached to storage data so that MAC authentication is performed to detect alteration during reading. A data storage structure is preferably tamper-proofed with the storage data encrypted using the device ID or the hardware ID of the device as an encryption key. These processes prevent the attribute information from being easily rewritten.

When the license data containing the usage condition information is stored in the hard disk, etc., the MAC generation, authentication, and encryption process are preferably performed to control tampering and easy reading.

An RAM (Random Access Memory) 203 stores the program performed by the CPU 201 and parameters, etc., appropriately changing in the execution of the program. The CPU 201, the ROM 202, the RAM 203, and the HDD 204 are interconnected to each other via a bus 205.

An input and output interface 206 is connected to the bus 205. Connected in turn to the input and output interface 206 are an input unit 207 including a keyboard, switches, buttons, a mouse, etc. operated by a user, and an output unit 208 including an LCD, a CRT, a loudspeaker, etc. for presenting various information to the user. Also connected to the input and output interface 206 is a communication unit 209 functioning as data transceiver means. A removable recording medium 211, such as a magnetic disc, an optical disc, a magneto-optical disc, or a semiconductor memory is loaded onto a drive 210 connected to the input and output interface 206. The drive 210 executes a data read process and a data write process on the removable recording medium 211.

The communication unit 209 connected to the network organizes data, supplied from the CPU 201 or the HDD 204, such as a content or a license, into a predetermined format packet, and transmits the packet over the network, while outputting data, such as a content or a license, contained in a packet received via the network, to the CPU 201, the RAM 203, or the HDD 204.

FIG. 2 illustrates a hardware structure of a personal computer (PC) 31 as one example of the user device of FIG. 1. The information processing apparatus using contents is not limited to the PC, but the TV 32, the portable-type replay device 33, the PDA 34, the replay player 35, the memory card 36, or any other electronic apparatus or information processing apparatus as shown in FIG. 1. Each apparatus has its own hardware structure, and performs a process in accordance with the hardware thereof.

The information processing apparatus as the user device using the content has a usage condition interpretation module for interpreting the usage condition, contained in the license data received from a service provider, with respect to the content to be used. More specifically, the information processing apparatus includes a memory storing a usage condition interpretation program and a CPU as a processor executing the usage condition interpretation program. The information processing apparatus performs an interpretation process of the usage condition of the license, thereby determining whether own device is eligible to use the content. The information processing apparatus uses the content on condition that the usage condition is satisfied.

Content Usage Condition Interpretation Process

The content usage condition information interpretation process performed by the information processing apparatus as the user device using the content will now be discussed.

Figure 3:
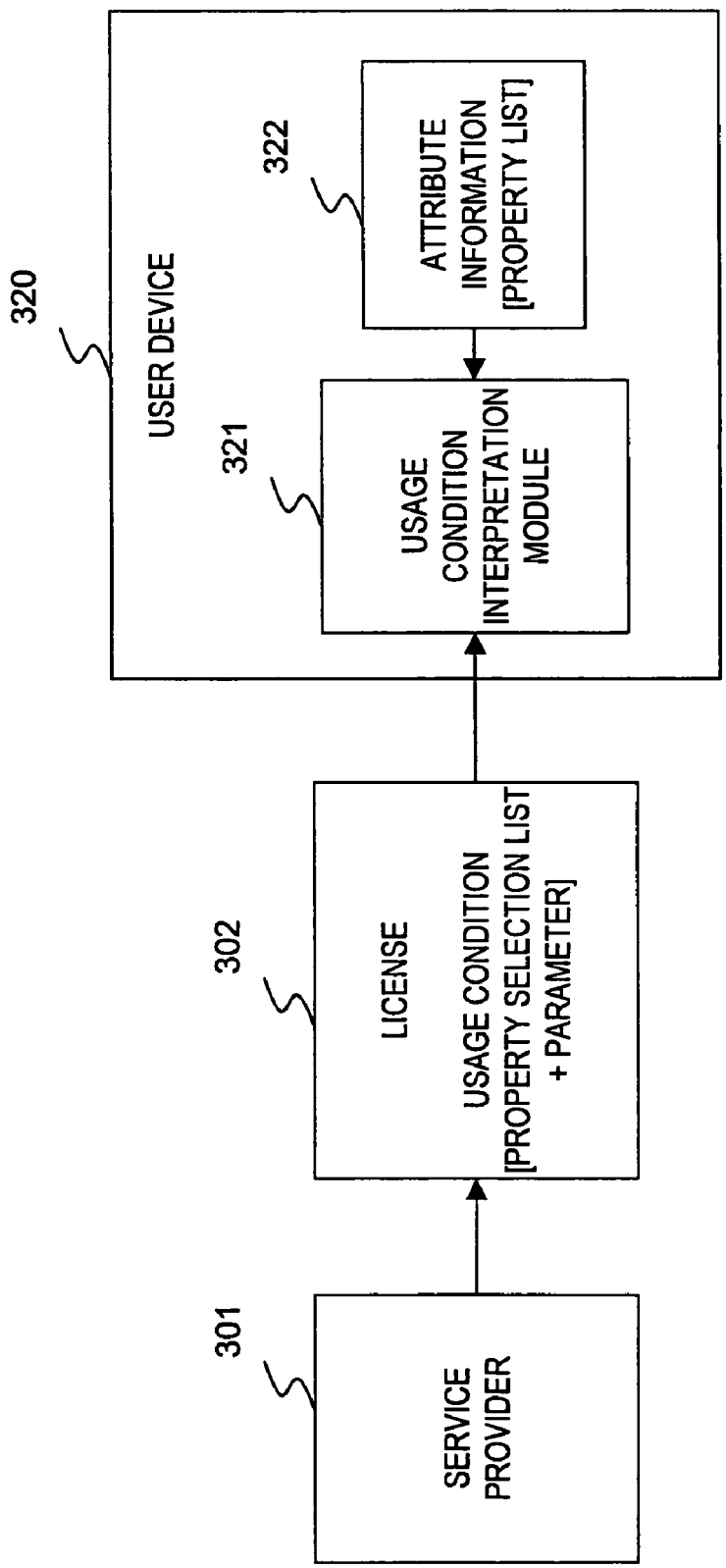
FIG. 3 illustrates the process of a usage condition interpretation module in the user device.

Referring to FIG. 3, the content usage condition information interpretation process of the user device will be discussed.

A user device 320, which performs a content usage process such as recording, playing and moving of the content, stores attribute information 322 in a memory thereof. A service provider 301 supplies a user device 320 with a license 302 containing the content usage condition information via a network or a medium.

As previously discussed, the user device 320 contains a usage condition interpretation module 321. More specifically, the user device 320 contains a memory storing the usage condition interpretation program and an executing processor (CPU). The usage condition interpretation module 321 receives the content usage condition information contained in the license 302 and the attribute information [property list (PL)" 322] stored in the memory of own device, and determines content use eligibility based on both pieces of data.

The content usage condition information contained in the license 302 is data containing [property selection list (PSL)] and a parameter. The specific property selection list (PSL) and parameter will be discussed later. The usage interpretation module of the user device 320 checks [property selection list (PSL)] and the parameter in the license against [property list (PL)] stored in the memory of own device.

Figure 4:
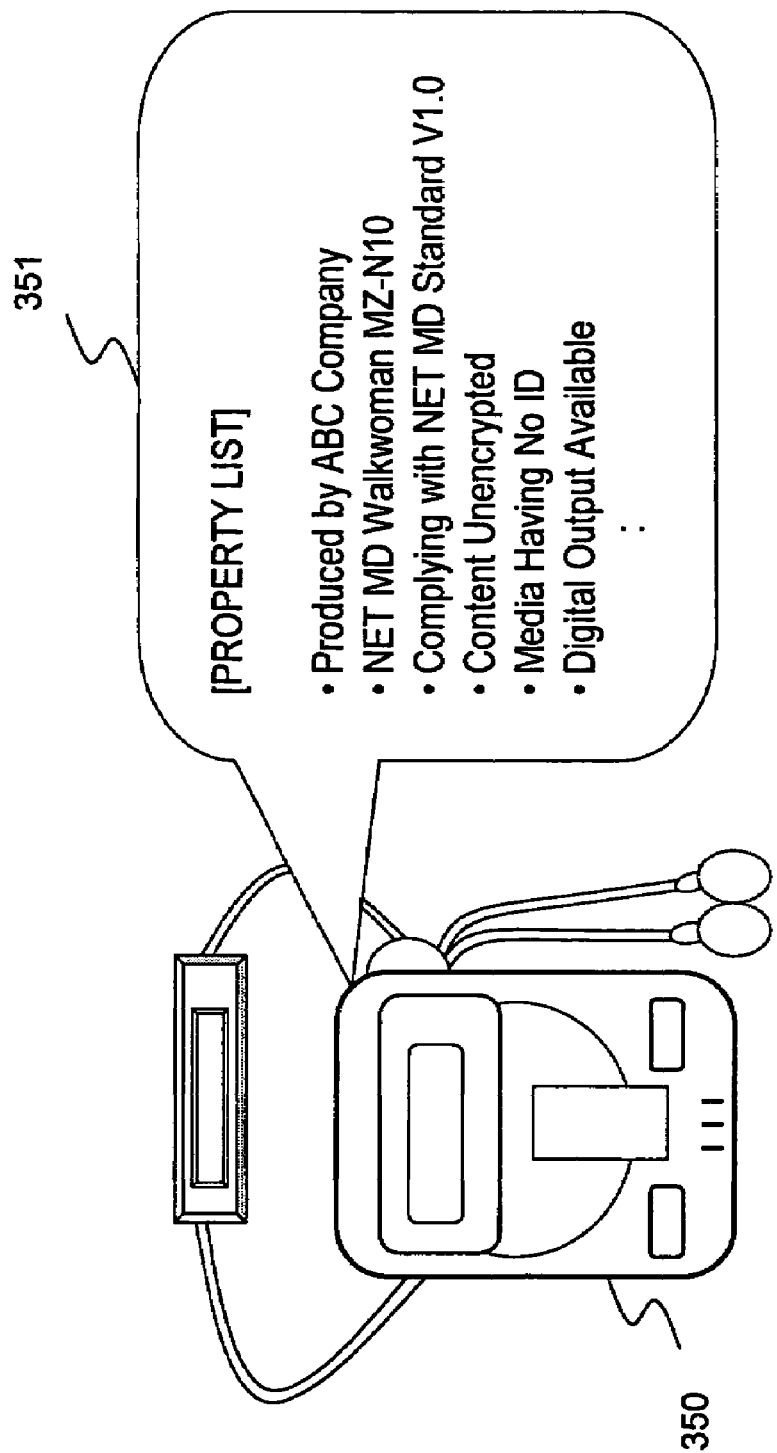
FIG. 4 illustrates a property list as attribute information stored in the user device.

FIG. 4 illustrates an example of property list as the device attribute information stored in the user device. A property list 351 is stored in a memory of a user device 350 as the information processing apparatus using contents. As shown in FIG. 4, the following items are listed:
Manufactured by ABC Company
NET MD Walkwoman MZ-N10
Complying with NET MD Standard V1.0
Content Unencrypted
Media having no ID
Digital Output Available Information like the name of manufacturer, type, and model of the device as the attribute information of the device listed above is stored in the memory as the property list. These pieces of data may be in any description form, such as a character string like text data, numerical data, data of code formed of numerals and characters. In other words, the property list is described in any of text data, code data, and numerical data. Specific example of the property information described alphabets as text data will be discussed later.

Figure 5:
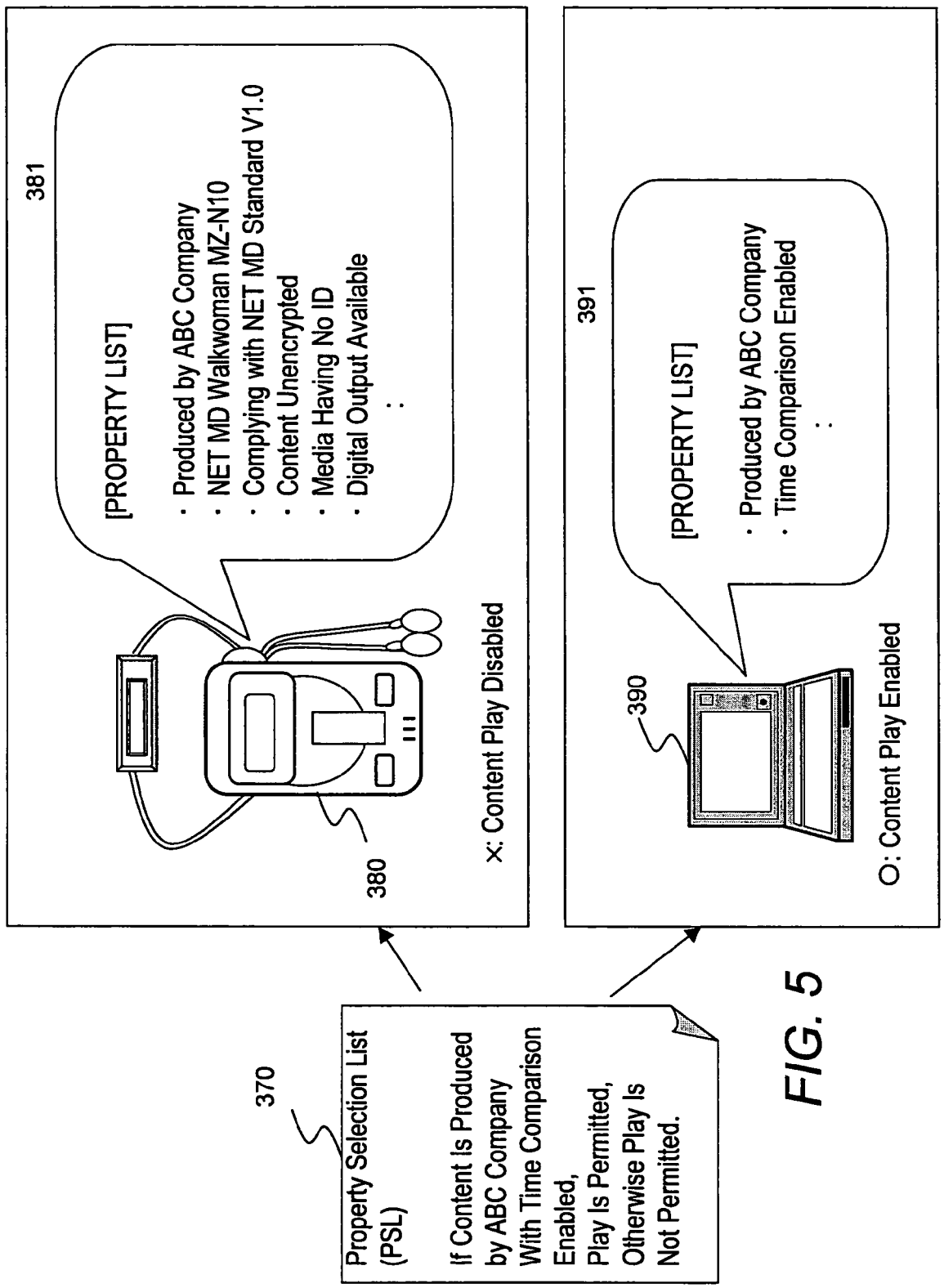
FIG. 5 illustrates a determination process of a content usage condition wherein the property list is applied as the attribute information stored in the user device.

As shown in FIG. 5, the usage condition interpretation module of the user device determines the content use eligibility by checking [property selection list (PSL)] in the license against [property list (PL)] stored in the memory of own device. The usage condition interpretation module performs the determination process by determining whether any of text data, code data, and numerical data matching the property definition data as the data constituting the property selection list received from the service provider is contained in the property list stored in the memory of the user device.

Referring to FIG. 5, usage condition interpretation modules of two different user devices 380 and 390 process license data 370 stating a condition for permitting playing.

As the property selection list, a content play process condition "if the content is manufactured by ABC company with time comparison enabled, playing is permitted; otherwise, playing is not permitted" is recorded in the license 370. This statement is described, for example, in XML data together with a code indicating a process step. A specific example of description will be discussed later.
Set in the user device 380 as the property list is:
Manufactured by ABC Company
NET MD Walkwoman MZ-N10
Complying with NET MD Standard V1.0
Content Unencrypted
Media having no ID
Digital Output Available
and
Set in the user device 390 as the property list is:
Manufactured by ABC Company
Time comparison enabled The usage condition interpretation module of the user device 380 determines that a property list 381 of own device fails to satisfy the described condition of the property selection list (PSL) of the license. More specifically, since the function of [time comparison enabled] described in the property selection list is not described in the property list, the usage condition interpretation module determines that the user device 380 has no attribute responsive to the property selection list (PSL).

A content playing process condition "if the content is manufactured by ABC company with time comparison enabled, playing is permitted; otherwise, playing is not permitted" is described in the license data 370. The user device 380 is not permitted to use the content, and as a result, the user device 380 does not proceed to an acquisition process of a content key, and the content use is not executed.

On the other hand, the usage condition interpretation module in the user device 390 determines that the property list 391 of own device satisfies the described condition of the property selection list (PSL) of the license. Since the functions "Manufactured by ABC Company" and "Time comparison enabled" described in the property selection list are described in the property list of own device, the usage condition interpretation module determines that the user device 390 satisfies the described condition of the property selection list (PSL). As a result, the user device 390 proceeds to an acquisition process of a content key, acquires the content key, and decrypts an encrypted content using the acquired content key.

Figure 6:
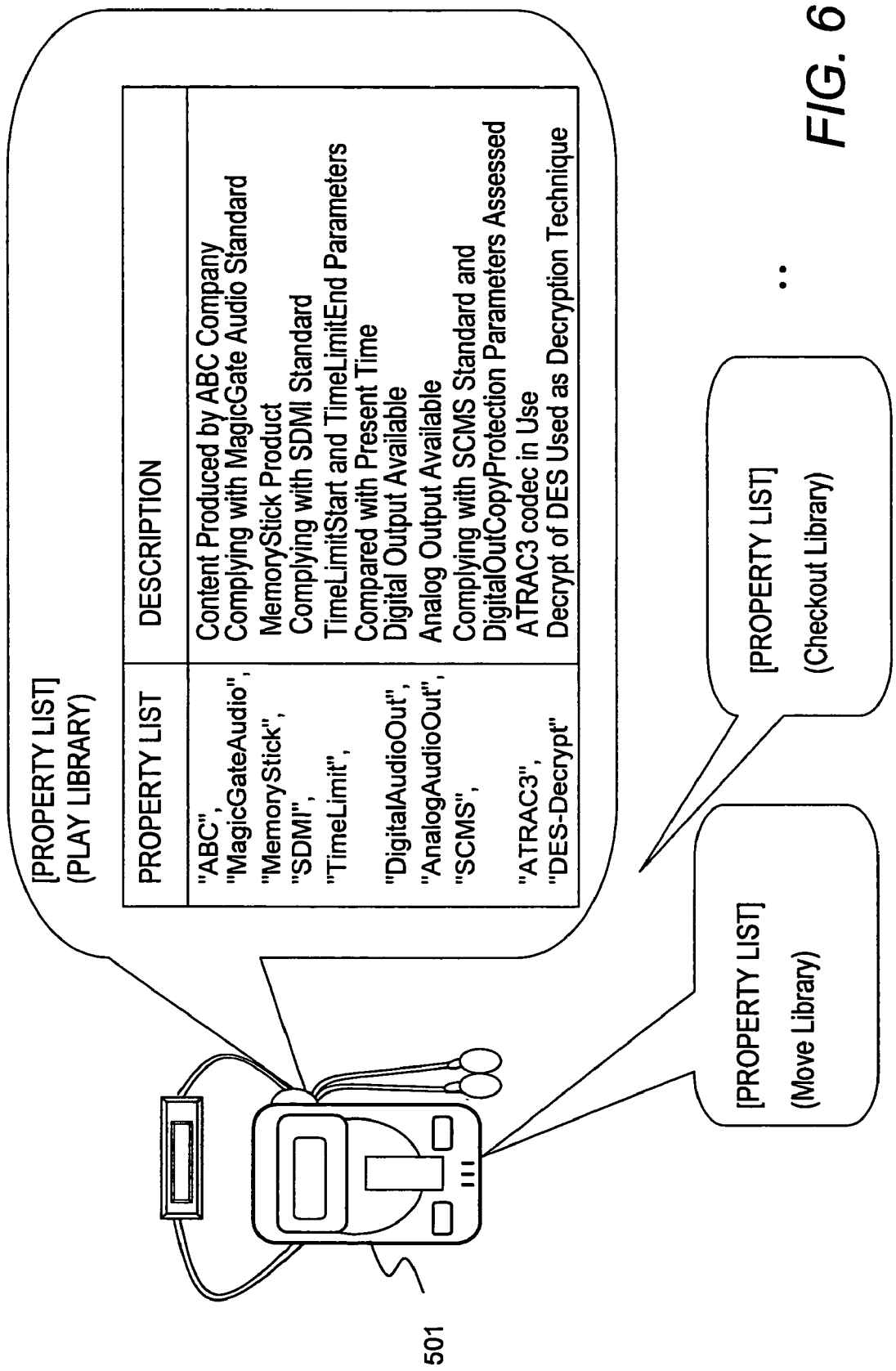
FIG. 6 specifically illustrates the property list as the attribute information stored in the user device.

FIGS. 6 and 7 specifically illustrate the property list as the attribute information stored in the memory of the user device and the property selection list (PSL) of the license, respectively.

FIG. 6 illustrates the property list as the attribute information stored in a memory of a user device 501.

Referring to FIG. 6, a plurality of property lists are stored in the memory of the user device 501 accounting for the content usage such as playing, moving, or checkout of the content. In other words, a property list is set on a per library unit basis, the library unit accounting for a category of the content usage. As will be discussed with reference to FIG. 7, the content usages such as a content playing condition, a content move condition, a content checkout condition, etc. are descried in the property selection list of the license.

FIG. 6 shows the property list as a specific example of a play library and the description thereof. The play library is contained in a plurality of property lists accounting for the content usages stored in the memory of the user device 501.

The property list shown in FIG. 6 is set using an alphabet character string. Stored here as the property list are the name of manufacturer, standard information the device complies with, digital output, analog output, encode/decode processing function, such as ATRACK3, data encryption process function, such as DES, identification data of the device, and function data.

FIG. 7 shows an example of property list contained in a license. Listed as XML data here are a property selection list and parameters describing a usage condition of content play in a data section 401, a property selection list and parameters describing a usage condition of a content move in a data section 402, and a property selection and parameters describing a usage condition of a content checkout in a data section 403.

The description of the data section 401 will now be discussed. The description of the data section 401 is listed here.

<Play>
   <PropertySelectionList>
   MagicGateAudio, 0x82;
   TimeLimit, 0x81;
   </PropertySelectionList>
   <Parameter>
   TimeLimitStart=20030101000000000,
   TimeLimitEnd=20030131235900000,
   DigitalOutCopyProtection=1

<Play>

<Play> represents the start of the usage condition information relating to the playing of the content.

<PropertySelectionList> represents the start of the property selection list relating to the playing of the content.
   MagicGateAudio, 0x82;
   TimeLimit, 0x81;

represents each of property definition data as data constituting the property selection list, and means the execution of a process defined in code [0x82] relating to the property [MagicGateAudio], and the execution of a process defined in code [0x81] relating to time limit [TimeLimit].

The usage condition interpretation module in the user device performs the process defined by the code [0x82] relating to the property definition data [MagicGateAudio], and the process defined by the code [0x81] relating to the time limit [TimeLimit].

The codes [0x82] and [0x81] are process setting codes (hex) defining the processes based on the property definition data. The usage condition interpretation module in the user device determines the process in response to the process setting code. The definition of these process setting codes and the specific process sequence thereof will be discussed later.

</PropertySelectionList> represents the end of the property selection list relating to the playing of the content.

<Parameter> represents the start of a parameter concerning the property selection list relating to the playing of the content.
   TimeLimitStart=20030101000000000,
   TimeLimitEnd=20030131235900000,
   DigitalOutCopyProtection=1
   represent specific parameters.
   TimeLimitStart=20030101000000000
   TimeLimitEnd=20030131235900000 represent a time period of Jan. 1, 2003-Jan. 31, 2003, 23:59 as a time period during which the content is usable for replaying. DigitalOutputCopyProtection=1 means that a digital output is permitted with a rule of copy protection code=1 in the digital output of the content.

represents the end of the parameter of the property selection list in the playing of the content.

</Play> represents the end of the usage condition information relating to the playing of the content.

The property selection list and the parameter for the move of the content are described in XML data in the data section 402, and the property selection list and the parameter for the checkout of the content are described in XML data in the data section 403.

The process setting code set in the property selection list will now be discussed with reference to FIG. 8. The process setting codes include 0x00 through 0x83 as illustrated in FIG. 8, and have the meanings as listed.

As previously discussed with reference to FIG. 7, the process setting code is set to be bound to data listed in the property selection list, namely, each property definition data.

The usage condition interpretation module of the user device determines, in the order from the top to the bottom of the property selection list, whether the property definition data listed in the property selection list, for example, [MagicGateAudio] and [TimeLimit] in the property selection list setting the content playing condition of FIG. 7, is contained in the property list as the attribute information stored in the memory of own device.

The process setting codes set the process in the case that the property definition data listed in the property selection list is found in the attribute information of own device and the process in the case that the property definition data listed in the property selection list is not found in the attribute information of own device. The usage condition interpretation module of the user device performs a determination process of determining the data corresponding to the property definition data is present in the property list defining the attribute of the user device. The usage condition interpretation module of the user device then performs a content use eligibility determination process in accordance with a process sequence to decide a next process step, based on the determination process and the process setting code accompanying the property definition data.

FIG. 8 lists processes in accordance with the process setting codes 0x00-0x83. The process setting codes [0x00-0x83] are bound to the process in the case that the property definition data listed in the property selection list is present in the attribute information of own device and the process in the case that the property definition data listed in the property selection list is not present in the attribute information of own device, and are defined beforehand as listed in FIG. 8. The usage condition interpretation module of the user device performs the process as listed in FIG. 8 depending on the type of code, and whether the property definition data is present in the property list of own device.

The rightmost column of FIG. 8 lists the meanings of the process setting codes. For example, if the process setting code [0x00] is set in the property definition data of the property selection list, the use of the content, for example, playing of the content is inhibited regardless of whether the property definition data is present in the property of own device. If the process setting code [0x01] is set in the property definition data of the property selection list, the use of the content, for example, the playing of the content is permitted regardless of whether the property definition data is present in the property of own device.

However, since the property list is set on a per content usage as shown in FIG. 7, a property list that inhibits the playing of the content while permitting the content to be moved may be set.

If the property definition data bounded to each of the process setting codes [0x02-0x7f] is present in the property of own device, the usage condition interpretation module of the user device proceeds to the next line. If the property definition data bounded to each of the process setting codes [0x02-0x7f] is not present in the property of own device, the usage condition interpretation module of the user device performs a jump to a lower code by the number of lines of two digits 02-7f, and performs a process of a code at the designated line.

For example, as for the process setting code [0x80], if the property definition data to which the process setting code [0x80] is bound is present in the property of own device, the use of the content is inhibited. If the property definition data to which the process setting code [0x80] is bound is not present in the property of own device, the usage condition interpretation module of the user device proceeds to the next line.

As for the process setting code [0x81], if the property definition data to which the process setting code [0x81] is bound is present in the property of own device, the use of the content is permitted. If the property definition data to which the process setting code [0x81] is bound is not present in the property of own device, the usage condition interpretation module of the user device proceeds to the next line.

As for the process setting code [0x82], if the property definition data to which the process setting code [0x82] is bound is present in the property of own device, the usage condition interpretation module of the user device proceeds to the next line. If the property definition data to which the process setting code [0x82] is bound is not present in the property of own device, the use of the content is inhibited.

As for the process setting code [0x83], if the property definition data to which the process setting code [0x83] is bound is present in the property of own device, the usage condition interpretation module of the user device proceeds to the next line. If the property definition data to which the process setting code [0x83] is bound is not present in the property of own device, the use of the content is permitted.

In this way, the process setting code bounded to the property definition data defining each property information is attached to the property selection list. The usage condition interpretation module of the user device determines whether the property information corresponding to the property definition data in the property selection list is present in the property list of own device, and performs a process of the process setting code in response to the determination result.

A process sequence in accordance with the process setting code performed by the usage condition interpretation module of the user device will now be discussed with reference to a flowchart of FIG. 9.

Figure 9:
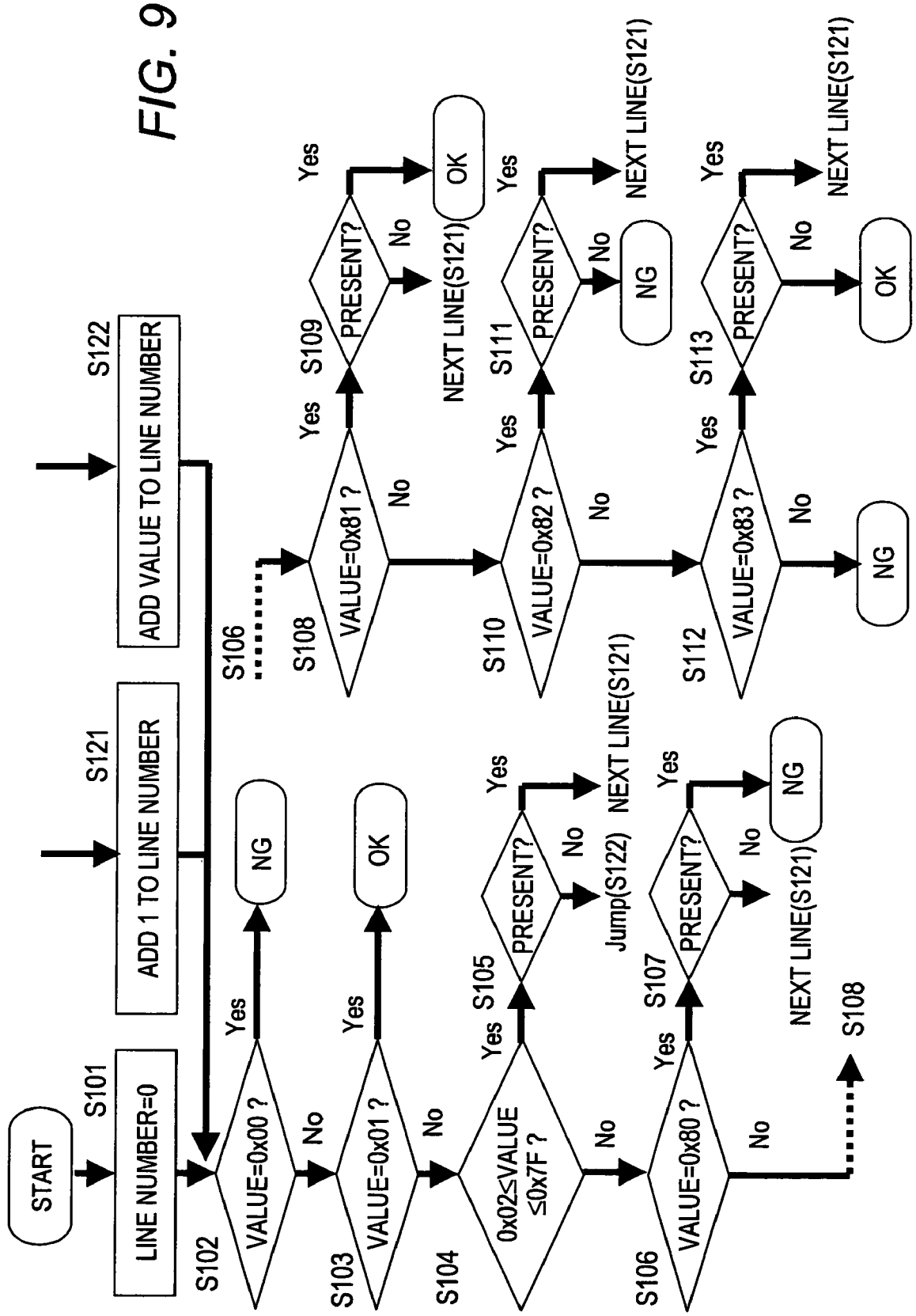
FIG. 9 is a flowchart illustrating a content use eligibility determination process based on the property selection list, performed by a usage condition interpretation module in the user device.

The process represented by the flowchart of FIG. 9 is a usage condition interpretation process of any of the data sections 401, 402, and 403 of FIG. 7 performed by the usage condition interpretation module of the user device.

In step S101, line number=0 is set. The line number here refers to a line number of each property definition data in the property selection list, and is incremented by one at every line using integers 0-n.

The usage condition interpretation module performs the process based on the property definition data at the first line [line number=0] and the process setting code set in the property definition data.

In step S102, the usage condition interpretation module determines whether the value of the process setting code is [0x00]. If it is determined that the value of process setting code is [0x00] (Yes), the usage condition interpretation module determines that the content use is inhibited, regardless of whether or not the property definition data is present in the property of own device as previously discussed with reference to FIG. 8.

If it is determined that the value of the process setting code is not [0x00] (No), the usage condition interpretation module proceeds to step S103 to determine whether the value of the process setting code is [0x01]. If it is determined that the value of the process setting code is [0x01] (Yes), the usage condition interpretation module determines that the use of the content is permitted, regardless of whether or not the property definition data is present in the property of own device as previously discussed with reference to FIG. 8.

If it is determined that the value of the process setting code is not [0x01] (No), the usage condition interpretation module proceeds to step S104 to determine whether the value of the process setting code is any of [0x02]-[0x7F]. If it is determined that the value of the process setting code is any of [0x02-0x7f] (Yes), the usage condition interpretation module proceeds to step S105 to determine whether the property definition data bound to the process setting code [0x02-0x7f] is present in the property of own device. If it is determined that the property definition data bound to the process setting code [0x02-0x7f] is present (Yes), the usage condition interpretation module proceeds to the next line (process of S121). If it is determined that the property definition data bound to the process setting code [0x02-0x7f] is not present (No), the usage condition interpretation module performs a jump process (S122) to a lower code by the number of lines of two digits of 02-7f.

If it is determined in step S104 that the value of the process setting code is not any of [0x02-0x7f] (No), the usage condition interpretation module proceeds to step S106 to determine whether the value of the process setting code is [0x80]. If it is determined that the value of the process setting code is [0x80] (Yes), the usage condition interpretation module proceeds to step S107 to determine whether the property definition data bound to the process setting code [0x80] is present in the property of own device. If it is determined that the property definition data bound to the process setting code [0x80] is present in the property of own device (Yes), the usage condition interpretation module determines that the use of the content is inhibited. If it is determined that the property definition data bound to the process setting code [0x80] is not present in the property of own device (No), the usage condition interpretation module proceeds to the next line (process of S121).

If it is determined in step S106 that the value of the process setting code is not [0x80] (No), the usage condition interpretation module proceeds to step S108 to determine whether the value of the process setting code is [0x81]. If it is determined that the value of the process setting code is [0x81] (Yes), the usage condition interpretation module proceeds to step S109 to determine whether the property definition data bound to the process setting code [0x81] is present in the property of own device. If it is determined that the property definition data bound to the process setting code [0x81] is present in the property of own device (Yes), the usage condition interpretation module determines that the use of the content is permitted. If it is determined that the property definition data bound to the process setting code [0x81] is not present in the property of own device (No), the usage condition interpretation module proceeds to the next line (process of S121).

If it is determined in step S108 that the value of the process setting code is not [0x81] (No), the usage condition interpretation module proceeds to step S110 to determine whether the value of the process setting code is [0x82]. If it is determined that the value of the process setting code is [0x82] (Yes), the usage condition interpretation module proceeds to step S111 to determine whether the property definition data bound to the process setting code [0x82] is present in the property of own device. If it is determined that the property definition data bound to the process setting code [0x82] is present in the property of own device (Yes), the usage condition interpretation module proceeds to the next line (process of S121). If it is determined that the property definition data bound to the process setting code [0x82] is not present in the property of own device (No), the usage condition interpretation module determines that the use of the content is inhibited.

If it is determined in step S110 that the value of the process setting code is not [0x82] (No), the usage condition interpretation module proceeds to step S112 to determine whether the value of the process setting code is [0x83]. If it is determined that the value of the process setting code is [0x83] (Yes), the usage condition interpretation module proceeds to step S113 to determine whether the property definition data bound to the process setting code [0x83] is present in the property of own device. If it is determined that the property definition data bound to the process setting code [0x83] is present in the property of own device (Yes), the usage condition interpretation module proceeds to the next line (process of S121). If it is determined that the property definition data bound to the process setting code [0x83] is not present in the property of own device (No), the usage condition interpretation module determines that the use of the content is permitted.

If it is determined in step S112 that the value of the process setting code is not [0x83] (No), the usage condition interpretation module determines the use of the content is inhibited.

When the usage condition interpretation module of the user device determines in accordance with the process sequence that the use of the content is permitted, a content key acquisition processor in the user device performs the acquisition process of acquiring a content key to be applied to the decrypting process of an encrypted content, and acquires the content key, and decrypts the encrypted content to use the content. As previously discussed, the key is acquired through the decrypting process of decrypting the enabling key block (EKB) based on the device node key (DNK) that is provided to each user device in a hierarchical key delivery system. With that key, the encrypted content key is decrypted. The content key is thus acquired. The encrypted content is decrypted using the acquired content key. The enabling key block (EKB) is provided to the user device together with the encrypted content.

If the parameter corresponding to the property definition data as the data constituting the property selection list is contained in the usage condition information, the usage condition interpretation module of the user device also determines the content usage condition based on the parameter. For example, if available time of the content is set as a parameter, the usage condition interpretation module performs a time comparison process and then determines the content use eligibility process.

The usage condition interpretation module of the user device determines whether the property information corresponding to the property definition data in the property selection list is present in the property list of own device, and performs the process in accordance with the process setting code based on the determination result.

For example, in the structure of the property selection list of FIG. 10, the usage condition interpretation module of the user device performs an interpretation process on the following content usage conditions:

(a) [AAAA] and [BBBB] are present in the attribute [property list] of own device, or (b) [CCCC] is present but [DDDD] is absent in the attribute [property list] of own device, or (c) [EEEE] and [FFFF] and [GGGG] are present in the attribute [property list] of own device.

The use of the content is permitted if one of the cases (a), (b), and (c) applies.

Even if a variety of property definition data is set in the property selection list as the content usage condition information, the user device performs a checking process of checking the property definition data against the property list as the attribute information stored in the memory of own device, and performs a process based on the process setting code bound to the property definition data. The user device thus determines content use eligibility determination process.

For example, if the property definition data [BBBB] is a new function installed in relatively new devices only and not installed in old devices, a new device having a property corresponding to the property definition data [BBBB] determines that the content is available to the device, on condition that the property is present in own device. An old device unable to interpret the property definition data [BBBB] performs a process of the next line [CCCC] and subsequent lines in accordance with the process setting code set in response to the property definition data [BBBB]. The old device then determines whether the above-mentioned condition (b) is satisfied, thereby performing appropriate content use eligibility determination.

If the property definition data [BBBB] is an old function that is installed in relatively old devices only and is not installed in new devices, the opposite of the above process is performed. In either case, an appropriate content use eligibility determination is performed.

The present invention has been discussed with reference to specific embodiments thereof. It is apparent that those skilled in the art can easily perform modifications and changes on the present invention without departing from the scope of the present invention. The foregoing description of the present invention has been presented for the purpose of illustration. It is not intended to limit the invention. The scope of this invention should be determined by reference to the claims appended thereto.

The above series of process steps may be performed using hardware, software, or a combination thereof. If the series of process steps is performed using software, a computer program of process sequence may be installed from a network or a recording medium to a memory of a computer assembled into dedicated hardware, or into a general-purpose computer that performs a variety of functions by installing various programs thereon.

The computer program may be recorded beforehand in a hard disk or a ROM (Read Only Memory) as a recording medium. The computer program may be temporarily or permanently stored (recorded) on a removable recording medium such as a flexible disk, a CD-ROM (Compact Disk Read Only Memory), a MO (Magneto-Optical) disc, a DVD (Digital Versatile Disc), a magnetic disc, or a semiconductor memory.

The computer program may be installed from the aforementioned removable recording medium to the computer, may be transferred from a download site to the computer in a wireless fashion, or may be transferred to the computer through a network such as a LAN (Local Area Network) or the internet in a wired fashion. The computer receives the computer program thus transferred, and installs the computer program onto the hard disk thereof.

The process steps discussed in this specification are sequentially performed in the time series order as stated. Depending on the throughput of the apparatus or as necessary, the steps may be performed in parallel or separately. The system in this specification refers to a logical set of apparatuses, and each apparatus is not necessarily housed in a single casing.

INDUSTRIAL APPLICABILITY

In accordance with the arrangement of the present invention as described above, in the content use eligibility determination process, the user device checks the property selection list as the content usage condition information against the property list as the attribute information list of the user device, performs the determination process of determining whether the data corresponding to the property definition data as the data constituting the property selection list is present in the property list. In accordance with a process sequence that decides a next process step based on the result of the determination process and a process setting code accompanying the property definition data, the user device performs the content use eligibility determination process. Even when new property definition data is added and set in the property selection list, user devices having a variety of functions perform precise content use eligibility determination process by simply performing a checking process with the property list as the attribute information stored in the storage unit thereof and a process based on the processing setting code. An authorized content usage mechanism taking into consideration the content copyright and the right to use the content is thus established.

In the arrangement of the present invention, the property selection list, which is divided into each category in accordance with the usage of the content such as replaying, movement, or checkout of the content, is set in the content usage condition information. The user device thus examines precisely the usage condition in accordance with the usage of the content.

In the arrangement of the present invention, the parameter is stored in response to the property definition data that is the data constituting the property selection list contained in the content usage condition information. The usage condition interpretation module of the user device performs the content usage condition determination based on the property selection list, while performing, based on the parameter, a determination process of a detailed set content usage condition.

The invention claimed is:

1. An information processing apparatus for granting access to content, comprising:

a storage unit for storing an attribute information list, the attribute information list identifying a type of information processing apparatus and identifying a function of the information processing apparatus; and an interpretation module for determining, before acquiring a content key for decrypting the content, whether the type and the function included in the attribute information list matches data contained in a property selection list distributed with the content, wherein:

the property selection list includes a process setting code, the process setting code defining a comparison for the information processing apparatus to perform between the attribute information list and the property selection list, the comparison including:

when the type and the function match the data, the information processing apparatus grants access to the content, and when the type and the function do not match the data, the information processing apparatus denies access to the content.

2. The information processing apparatus of claim 1, wherein the property selection list includes a parameter, and the interpretation module determines whether to grant access to the content based on the parameter.

3. The information processing apparatus of claim 1, wherein the attribute information list is set on a per library unit basis with a library unit as a category corresponding to a usage of the content, and the interpretation module determines whether to grant access to the content based on the attribute information list using the per library unit basis.

4. The information processing apparatus of claim 1, wherein the attribute information list further includes at least one of text data, code data, and numerical data, and the interpretation module determines whether to grant access to the content by determining whether the text data, code data, or numerical data matches the data contained in the property selection list.

5. The information processing apparatus of claim 1, further comprising:

a processor for acquiring the content key when the information processing apparatus grants access to the content, wherein the content key decrypts the content.

6. The information processing apparatus of claim 5, wherein the information processing apparatus receives a device node key, and acquiring of the content key comprises decrypting an enabling block key based on the device node key.

7. A computer readable storage medium storing instructions which, when executed by a computer, perform a method for storing license information used to grant access to content, the method comprising:

storing a property selection list, the property selection list identifying a first type of information processing apparatus and identifying a first function of the information processing apparatus;

determining, before acquiring a content key for decrypting the content, whether the first type and the first function match a second type and a second function of an information processing apparatus that requests the content;

obtaining a process setting code from the license information, the process setting code defining a comparison for performing based on the property selection list;

executing the comparison defined by the process setting code;

granting access to the content when the first type and the first function match the second type and the second function; and denying access to the content when the first type and the first function do not match the second type and the second function.

8. The computer readable storage medium of claim 7, wherein the property selection list further comprises a parameter.

9. The computer readable storage medium of claim 7, further comprising dividing the property selection list into categories depending on the usage of the content.

10. The computer readable storage medium of claim 7, further comprising describing the property selection list using extended markup language data.

11. A method for granting access to content, comprising:

acquiring a property selection list, the property selection list identifying a first type of information processing apparatus and identifying a first function of the information processing apparatus;

acquiring an attribute information list, the attribute information list identifying a second type of information processing apparatus and identifying a second function of the information processing apparatus;

obtaining a process setting code from the property selection list, the process setting code defining a comparison for performing between the attribute information list and the property selection list;

executing, before acquiring a content key for decrypting the content, the comparison defined by the process setting code to determine whether to grant access to the content;

granting access to the content when the first type and the first function match the second type and the second function; and denying access to the content when the first type and the first function do not match the second type and the second function.

12. The method of claim 11, wherein the property selection list includes a parameter, and the comparison determines whether to grant access to the content based on the parameter.

13. The method of claim 11, wherein the attribute information list is set on a per library unit basis with a library unit as a category corresponding to a usage of the content, and the comparison determines whether to grant access to the content based on the attribute information list using the per library unit basis.

14. The method of claim 11, wherein the attribute information list further includes at least one of text data, code data, and numerical data, and the comparison determines whether to grant access to the content by determining whether the text data, code data, or numerical data matches the data contained in the property selection list.

15. The method of claim 11, further comprising:

acquiring the content key when access is granted to the content, wherein the content key decrypts the content.

16. The method of claim 14, further comprising:

receiving a device node key, and acquiring the content key by decrypting an enabling block key based on the device node key.

17. A computer readable storage medium storing instructions which, when executed by a computer, perform a method for granting access to content, the method comprising:

acquiring a property selection list, the property selection list identifying a first type of information processing apparatus and identifying a first function of the information processing apparatus;

acquiring an attribute information list, the attribute information list identifying a second type of information processing apparatus and identifying a second function of the information processing apparatus;

comparing, before acquiring a content key for decrypting the content, the property selection list to the attribute information list based on a process setting code included in the property selection list;

granting access to the content when the first type and the first function match the second type and the second function; and denying access to the content when the first type and the first function do not match the second type and the second function.

* * * * *